US010210337B2

(12) United States Patent
Panchbudhe et al.

(10) Patent No.: US 10,210,337 B2
(45) Date of Patent: Feb. 19, 2019

(54) INFORMATION RIGHTS MANAGEMENT USING DISCRETE DATA CONTAINERIZATION

(71) Applicant: ANOOSMAR TECHNOLOGIES PRIVATE LIMITED, Pune (IN)

(72) Inventors: Ankur Panchbudhe, Pune (IN); Praneeth Siva, Pune (IN); Amol Vaikar, Pune (IN); Yusuf Batterywala, Pune (IN)

(73) Assignee: ANOOSMAR TECHNOLOGIES PRIVATE LIMITED, Pune (IN)

( * ) Notice: Subject to any disclaimer, the term of this patent is extended or adjusted under 35 U.S.C. 154(b) by 0 days.

(21) Appl. No.: 14/569,809

(22) Filed: Dec. 15, 2014

(65) Prior Publication Data

US 2016/0171222 A1    Jun. 16, 2016

(51) Int. Cl.
  *H04L 29/06*  (2006.01)
  *G06F 21/60*  (2013.01)
  *G06F 21/62*  (2013.01)

(52) U.S. Cl.
  CPC ............ *G06F 21/602* (2013.01); *G06F 21/62* (2013.01); *H04L 63/105* (2013.01); *G06F 2221/2107* (2013.01); *G06F 2221/2141* (2013.01)

(58) Field of Classification Search
  CPC .. G06F 21/10; G06F 21/86; G06F 2221/2135; G06F 2221/0737; G06F 2221/2151
  USPC ..................... 726/3, 12, 21, 22, 34
  See application file for complete search history.

(56) References Cited

U.S. PATENT DOCUMENTS

| | | | |
|---|---|---|---|
| 2005/0177716 A1* | 8/2005 | Ginter ..................... | G06F 21/10 713/157 |
| 2007/0162359 A1* | 7/2007 | Gokhale ................ | G06Q 10/08 705/28 |
| 2014/0282890 A1* | 9/2014 | Li ......................... | H04L 63/101 726/4 |
| 2015/0261782 A1* | 9/2015 | McFerrin .......... | G06F 17/30174 707/625 |

* cited by examiner

*Primary Examiner* — Daniel B Potratz
*Assistant Examiner* — William B Jones
(74) *Attorney, Agent, or Firm* — Mannava & Kang, P.C.; Vinay Malik (57) ABSTRACT

Disclosed herein are a method and a system for discrete data containerization for Information Rights Management. The system identifies based on a user request, data to be containerized. Further, the system receives at least one rule based on the data and attributes, which is to be used for containerizing the data. Further, using the rule, the system containerizes the data, wherein the data is containerized at individual data level.

6 Claims, 6 Drawing Sheets

INFORMATION RIGHTS MANAGEMENT USING DISCRETE DATA CONTAINERIZATION

TECHNICAL FIELD

The embodiments herein relate to Information Rights Management (IRM) and, more particularly, to discrete data containerization for Information Rights Management.

BACKGROUND

Data management is one of the prime areas of concern of the modern world. The term 'data management' does not just address way of organizing data, but also focuses on data security aspects. With the increasing popularity of 'Bring Your own Device (BYOD)' trend which allows users to use their personal device for professional/official use as well, data security concerns are at peak. BYOD allows users to access official data, which is of confidential nature, from any location. Further, the personal devices of users may not possess sufficient security means to fight malware and similar fraudulent attacks, which poses high data security risk.

Data containerization is a technique/mechanism which is used to protect data of the confidential nature, from unauthorized access. This may involve locking down the data to be protected, and providing access to a user only after a successful authentication check. However, existing data containerization techniques and systems have certain disadvantages. One disadvantage is that the existing systems do not work properly outside network boundaries of organization that is setting the IRM, as they may have to be connected to servers and other organizational specific systems to function properly. Another disadvantage is that the existing containerization techniques fail to match requirements of mobile work force enabled by the BYOD and other similar mechanisms. Another disadvantage is that the existing data containerization systems do not support all file formats, which might cause inconvenience to the users. Another disadvantage of the existing data containerization systems is that they support containerization only at application or device level, which might again cause inconvenience to users.

SUMMARY

In view of the foregoing, an embodiment herein provides a method for containerizing data. In this method, at least one data to be containerized is received from a data server, using a data management server. Further, at least one rule for containerizing the data is collected using the data management server and then, the collected data is containerized based on the at least one rule using the data management server, wherein the data is containerized at individual data level.

Embodiments further disclose a system for containerizing data. The system configured for receiving at least one data to be containerized from a data server, using a data management server. Further, at least one rule for containerizing the data is collected using the containerization module. Further, based on the at least one rule, the data is containerized using the containerization module, wherein the data is containerized at individual data level.

These and other aspects of the embodiments herein will be better appreciated and understood when considered in conjunction with the following description and the accompanying drawings.

BRIEF DESCRIPTION OF THE FIGURES

The embodiments herein will be better understood from the following detailed description with reference to the drawings, in which.

DETAILED DESCRIPTION OF EMBODIMENTS

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein disclose an Information Rights Management process by containerizing discrete data. Referring now to the drawings, and more particularly to FIGS. 1 through 6, where similar reference characters denote corresponding features consistently throughout the figures, there are shown embodiments.

Figure 1:
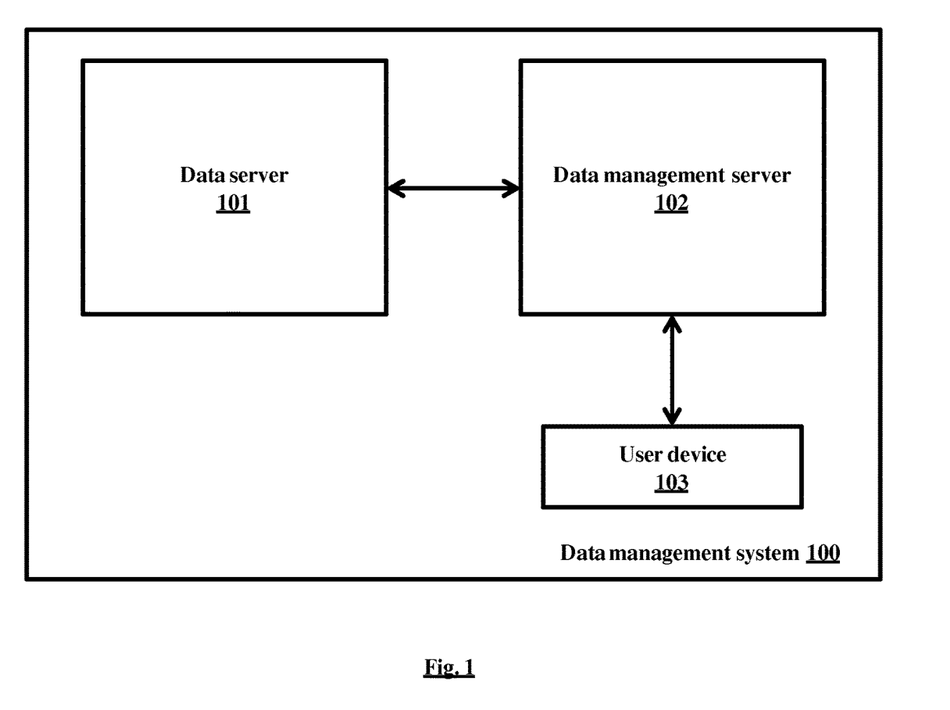
FIG. 1 illustrates a block diagram of data management system, as disclosed in the embodiments herein.

FIG. 1 illustrates a block diagram of data management system, as disclosed in the embodiments herein. The data management system 100 further comprises of a data server 101, a data management server 102, and at least one user device 103. The data server 101 may be configured to act as a data repository for saving all data that needs to be containerized and de-containerized. The data server 101 may be further configured to save information on data attributes, which may be used by the data management system 100 to differentiate between different data. The data server 101 may be further configured to save user attributes which may act as unique identifiers representing different users, and this information may be used by the system to differentiate between users to perform the containerization/de-containerization process. The data server 101 may be further configured to save any other data that is required to perform the containerization/de-containerization process.

The data management server 102 may be configured to perform containerization of data based on rule (s) configured by an authorized person, or by a machine based on settings configured by the authorized person. The data management server 102 may be further configured to perform de-containerization of data, based on access permissions configured for the user who is requesting data access. In another embodiment, the data management server 102 may be configured to perform de-containerization of data, based on access permissions configured for a machine which is requesting data access. In a preferred embodiment, the data management server 102 performs data containerization at individual files or folder levels. The data management server 102 may be further configured to allow or deny user access to data, based on rules/policies configured for that particular user, for the particular data the user is requesting for.

The user device 103 may be any device such as but not limited to a mobile phone, a personal computer, and a tablet PC, that may be configured to communicate with the data management server 102 for the purpose of containerization, or de-containerization of data.

Figure 2:
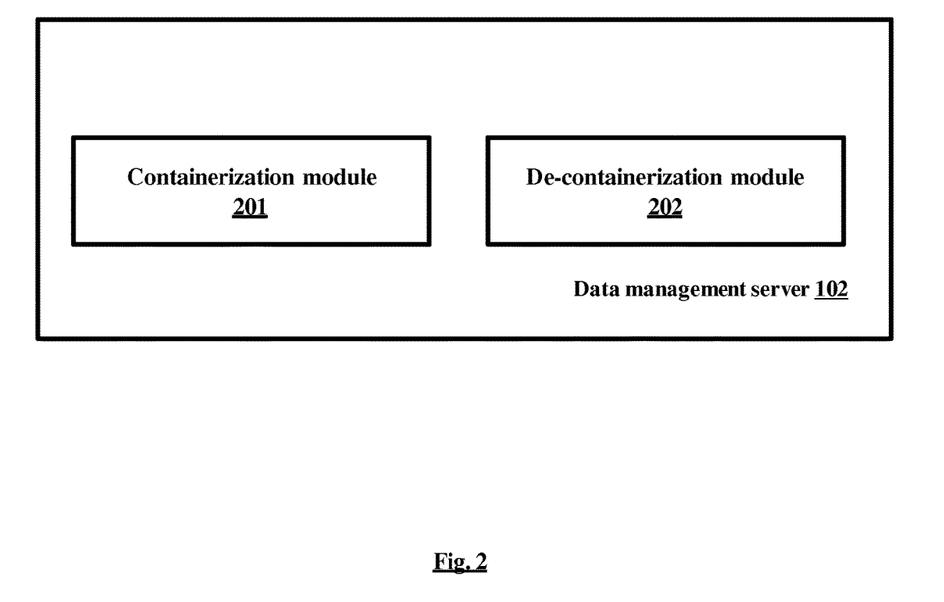
FIG. 2 illustrates a block diagram which depicts various components of data management server, as disclosed in the embodiments herein.

FIG. 2 illustrates a block diagram which depicts various components of data management server, as disclosed in the embodiments herein. The data management server 102 further comprises of a containerization module 201, and a de-containerization module 202.

The containerization module 201 may be configured to receive requests and commands with respect to data containerization, and containerize data based on rules/policies configured for data containerization, using a suitable encryption technique. In an embodiment, the containerization module 201 may be configured to collect rules required for data containerization from the user and/or a machine, by providing a suitable interface. In another embodiment, the containerization module 201 may be configured to collect rules required for data containerization from the data server 101. In an embodiment, the containerization module 201 may be capable of executing one or more data containerization modes. In another embodiment, the containerization module 201 may select a suitable mode of data containerization, based on certain parameters. A few examples of parameters that may be considered by the containerization module 201 are, but not limited to, type of data, and information regarding containerization mode used for same/similar type of data in the past based on history data that may be maintained in the data server 101. The containerization module 201 may be further configured to identify duplicate data and to select at least one of a full or partial compression technique to containerize the data. By using the partial compression technique for repeated data, the containerization module 201 may ensure that the same data is not compressed and saved twice, thereby saving storage space and effort.

The de-containerization module 202 may be configured to perform authentication check of a data access request received from a user, or from a machine through an Application Programming Interface (API). The de-containerization module 202 may be further configured to perform, upon successful authentication of user and data request received from the user, de-containerization of data requested by the user. The de-containerization module 202 may be configured to use any suitable decryption technique for the purpose of de-containerizing the data. The de-containerization module 202 may be further configured to perform de-duplication and compression of data.

Figure 3:
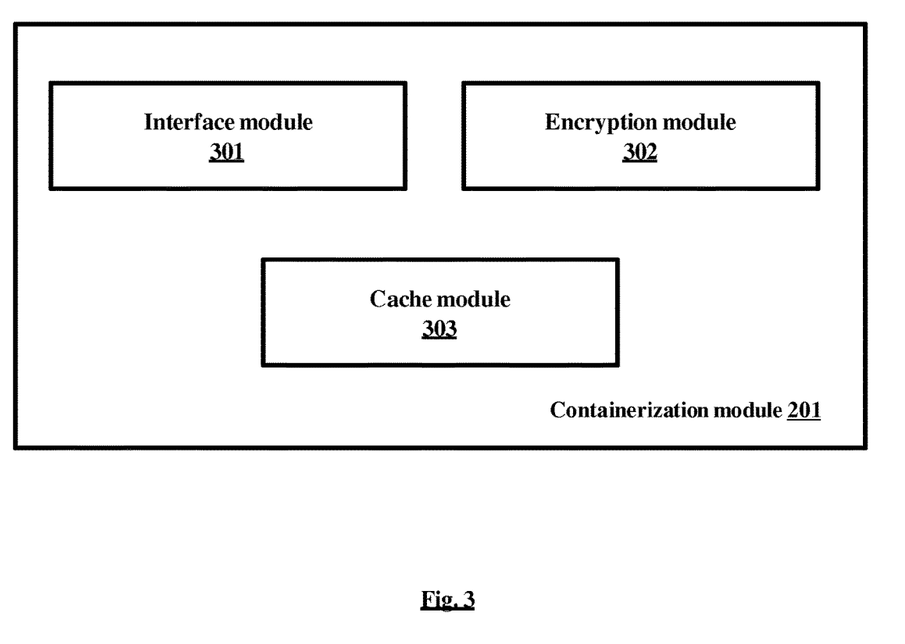
FIG. 3 illustrates a block diagram which depicts various components of containerization module, as disclosed in the embodiments herein.

FIG. 3 illustrates a block diagram which depicts various components of containerization module, as disclosed in the embodiments herein. The containerization module 201 further comprises of an interface module 301, an encryption module 302, and a cache module 303. The interface module 301 may be configured to provide means for the containerization module 201 to establish communication with data server 101, and the user device 103, for the purpose of collecting data required for the purpose of data containerization. A few examples of the data that may be collected using the interface 301 module are, but not limited to, user request pertaining to the data containerization process, related user attributes, related data attributes, passwords, secrets, additional identity information, and rules. The term 'rule' may refer to at least one setting or configuration that may govern the data containerization process.

The encryption module 302 may be configured to use suitable data encryption means to containerize the data selected by the user. In various embodiments, the containerization module 302 may use one or more encryption techniques for the purpose of encrypting the data, and suitable encryption technique may be selected based on at least one parameter as configured by the user.

The cache module 303 may collect from the data server 101 and temporarily save, data required for the purpose of containerizing the data. For example, the cache module 303 may collect information such as, but not limited to data attributes, user attributes, and rule for data containerization which is specific to the user who provided the data containerization request and the data selected for containerization purpose. In various embodiments, the data collected and saved in the cache module 303 may be erased upon receiving a user command, or automatically upon successful completion of the data containerization process. In another embodiment, the data may be erased from the cache module 303 while the data containerization is in progress.

Figure 4:
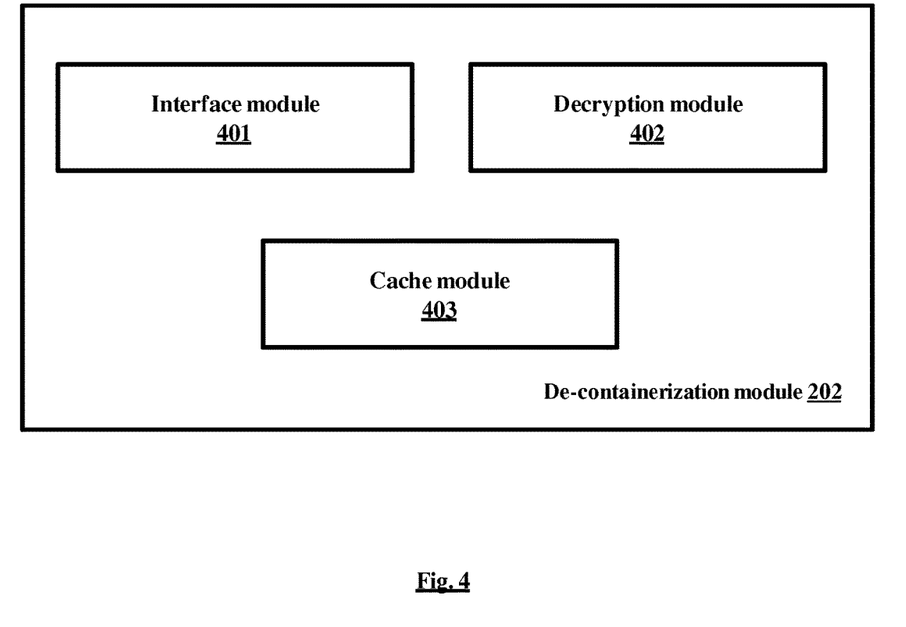
FIG. 4 illustrates a block diagram which depicts various components of de-containerization module, as disclosed in the embodiments herein.

FIG. 4 illustrates a block diagram which depicts various components of de-containerization module, as disclosed in the embodiments herein. The de-containerization module 202 further comprises of interface module 401, decryption module 402, and cache module 403. The interface module 401 may be configured to provide means for the de-containerization module 202 to establish communication with data server 101, the containerization module 201, and the user device 103, for the purpose of collecting data required for the purpose of data de-containerization. A few examples of the data that may be collected using the interface module 401 are, but not limited to, user request to access a particular data, related user attributes, passwords, secrets, additional identity information, related data attributes, and rules.

The decryption module 402 may be configured to check, upon receiving a data request from a user, whether that particular user is authorized to access the data. The decryption module 402 may be further configured to check access permission granted for the user, for the data being considered. For example, while one user may be given only 'read' permission, the other user may be given read and edit permissions. Further, the read and/or the edit permissions may be restricted at a content, page, and/or paragraph levels. The decryption module 402 may be further configured to use, upon identifying that the user has permission to access the data, to use suitable data decryption means to de-containerize the data selected by the user. In various embodiments, the de-containerization module 402 may use one or more decryption techniques for the purpose of decrypting the data, and suitable decryption technique may be selected based on at least one parameter configured by the user.

The cache module 403 may collect from the data server 101 and temporarily save, data required for the purpose of de-containerizing the data. For example, the cache module 403 may collect information such as, but not limited to data attributes, user attributes, and rule for data de-containerization which is specific to the user who provided the data de-containerization request and the data selected for de-containerization purpose. In various embodiments, the data collected and saved in the cache module 403 may be erased upon receiving a user command, immediately as and when the de-containerization is happening, or automatically upon successful completion of the de-containerization process.

Figure 5:
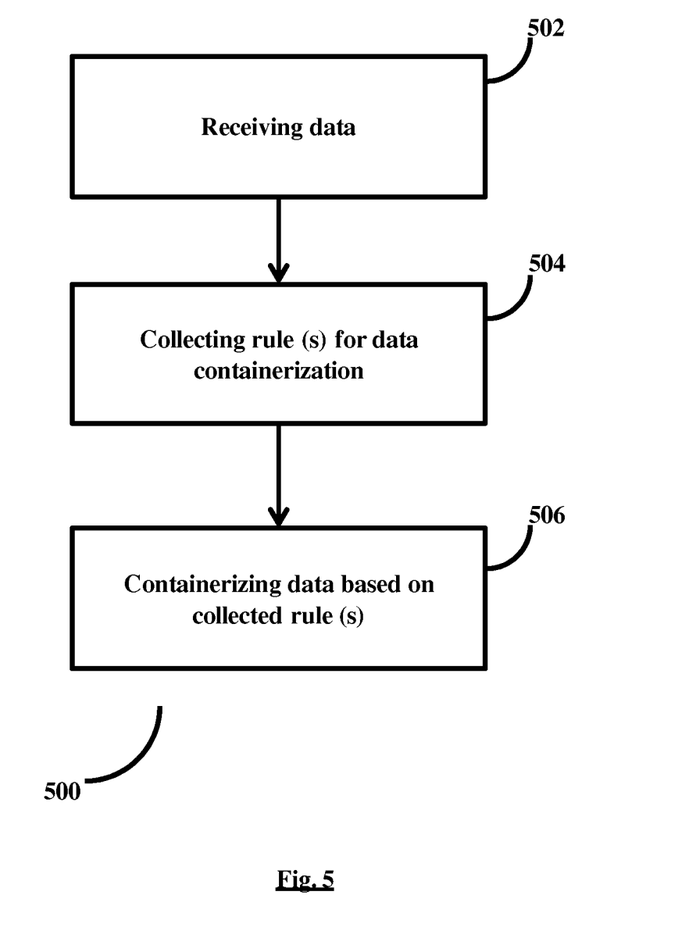
FIG. 5 is a flow diagram which shows steps involved in the process of containerizing data using the data management system, as disclosed in the embodiments herein.

FIG. 5 is a flow diagram which shows steps involved in the process of containerizing data using the data management system, as disclosed in the embodiments herein. Initially, the data management server 102 receives (502) data to be containerized. In an embodiment, the user may upload the data to be containerized, to the data management server 102 and the data management server 102 may store the data received from the user, in the data server 101 or in any other associated storage medium, which may be internal or external to the data management system 100. In another embodiment, if the data is already available in the data server 101 or any other storage medium associated with the data management server 102, the user may, using a suitable user interface, select the data to be containerized.

The data management system 100 provides suitable option (s) for the user to initiate data containerization process, using suitable user interface associated with the interface module 301. The data management system 100 may further provide suitable option (s) for the user to configure rule (s) to be used for the purpose of containerizing the data. In an embodiment, the user may define and configure at least one new rule. In another embodiment, the user may select, from a pre-defined set of rules, at least one rule for the purpose of data containerization.

The containerization module 201 collects (504) the rule (s) selected by the user, and further selects a suitable data containerization technique for the purpose of data containerization. Selecting suitable data containerization technique may involve choosing at least one suitable setting or configuration that helps to perform discrete data containerization as specified by a user. Selecting the encryption mechanism may also involve identifying at least one suitable encryption mechanism for the purpose of encrypting the data being containerized. In an embodiment, the encryption may be made optional. Further, using the selected setting or configuration, the encryption module 302 in the containerization module 201 containerizes (506) the selected data, wherein the containerization involves containerizing the data at individual data and/or folder level.

To containerize the data, the containerization module 201 reads the data and/or its meta-data from a data source using the interface module 301. The encryption module 302 then parses and interprets the meta-data and the contents of the data and determines at least one attribute of the data, using at least one technique such as, but not limited to data mining, content analysis, file system meta-data and message headers. This might also require communicating with other modules including Server and/or third-party modules (e.g. Active Directory, LDAP, content management systems). Further, the attributes may include, but not limited to name of the data, folder or container names, device name and other device information, tags, labels, topics, subject, date-time parameters, owner and user information, user groups, geo-location information, sender and receiver information, data ACL (Access Control Lists), keywords, key phrases, categories, patterns and so on. The containerization module 301 then sends all or some of the collected data attributes and/or data, to the data server 101 to retrieve at least one containerization parameter, wherein the containerization parameter may involve at least one of rights associated with the data, and a derivation of the rights, or any such suitable parameter.

The data server 101, based on the received data attributes and/or data, determine at least one right to be applied for any or combination of the attributes. This is done based on at least one Policy and Right, which are pre-defined and pre-configured by the user or an administrator. The data server 101 then sends back either the rights or a derivation of them to the Containerization module 201. A few examples of the rights are:

List/Browse: Can list the data items in the container (e.g. files in a folder)—which items can be listed (or are visible) will depend on access parameters (see de-containerization). For example, certain files could be visible only in certain geography or IP address range.

Create: Can add a new data in the container, like a file to a folder.

View/Open: Can open or view the data inside the container with specified conditions including how the data is viewed/opened. For example, it can be viewed only 2 times, or only once a day, or it can be viewed only in certain formats (e.g. PDF), or it can be viewed only in USA, or only within the branch office network defined by IP and Wi-Fi, or only in a watermarked form, or in a steganographic form, or it can be opened only in MS Word. This could also include how the second user can interact with the data including things like copy-paste of data or content, screenshot, print and email.

Edit: Can edit/update data. This could also include which parts of data can be updated or limiting features like annotation or enforcing things like track/highlight changes.

Upload/Sync: Can upload or sync back (changed) data back to Server and/or Containerization module and/or first user Delete: Can delete data inside the container Share: Can share data with some other user and how the sharing happens. For example, sharing can be done only in containerized form, or only as PDF, or only within some geography or IP ranges.

Comment: Can comment on the data or annotate it

Copy/Download: Can copy/download data outside the container

Download as Container file: Can copy/download data outside as another container

Refresh: Can receive an updated version of the data inside container (from Server or Containerization module)

Offline access: Can access the data when not connected to Server or Containerization module Approval: Requires approval from Server and/or Containerization module and/or first user to open/view/etc.

Self-destruct: Destruct or corrupt the container when certain conditions are met. For example, when container moves outside corporate network or to a hostile country Expiry: Expire or disable the container after some time or after some number of accesses.

Use as attachment: Can attach the container or file(s) in it as attachment to messages or emails.

The containerization module 201 receives the rights or derived parameters from the data server 101 and determines, whether any further user input (s) is required and allowed. If user input is allowed and required, the same is collected through the interface module 301. The user input is combined with the data received from the data server 101 to determine the final set of parameters to be used for containerizing the data. If the final parameters indicate that containerization is not allowed or not required, then the process stops, and the user is given an appropriate response through the interface module 301.

If the final parameters indicate that data containerization is allowed and is required, the encryption module 302 is used to encrypt the data and, optionally, the corresponding meta-data, attributes and rights. In the encryption procedure, the choice of encryption method and encryption keys by the encryption module 302 may be based on fixed or random options or may be based on the data attributes. The encryption module 302 then produces an encrypted package containing the data and possibly, the meta-data, attributes and rights, in an encrypted form.

Result of the containerization process may be the data along with data pertaining to parameters such as, but not limited to rules, settings, information about user and/or data and/or device, authentication, authorization, policies, and settings. For example, if the data to be containerized is a folder with 10 files in it, the containerized data may be a folder that contains 10 individual/separate containers in it. In a various embodiments, the containerization module 201 may perform data containerization at device, application, and individual data levels.

The various actions in method 500 may be performed in the order presented, in a different order or simultaneously. Further, in some embodiments, some actions listed in FIG. 5 may be omitted.

Figure 6:
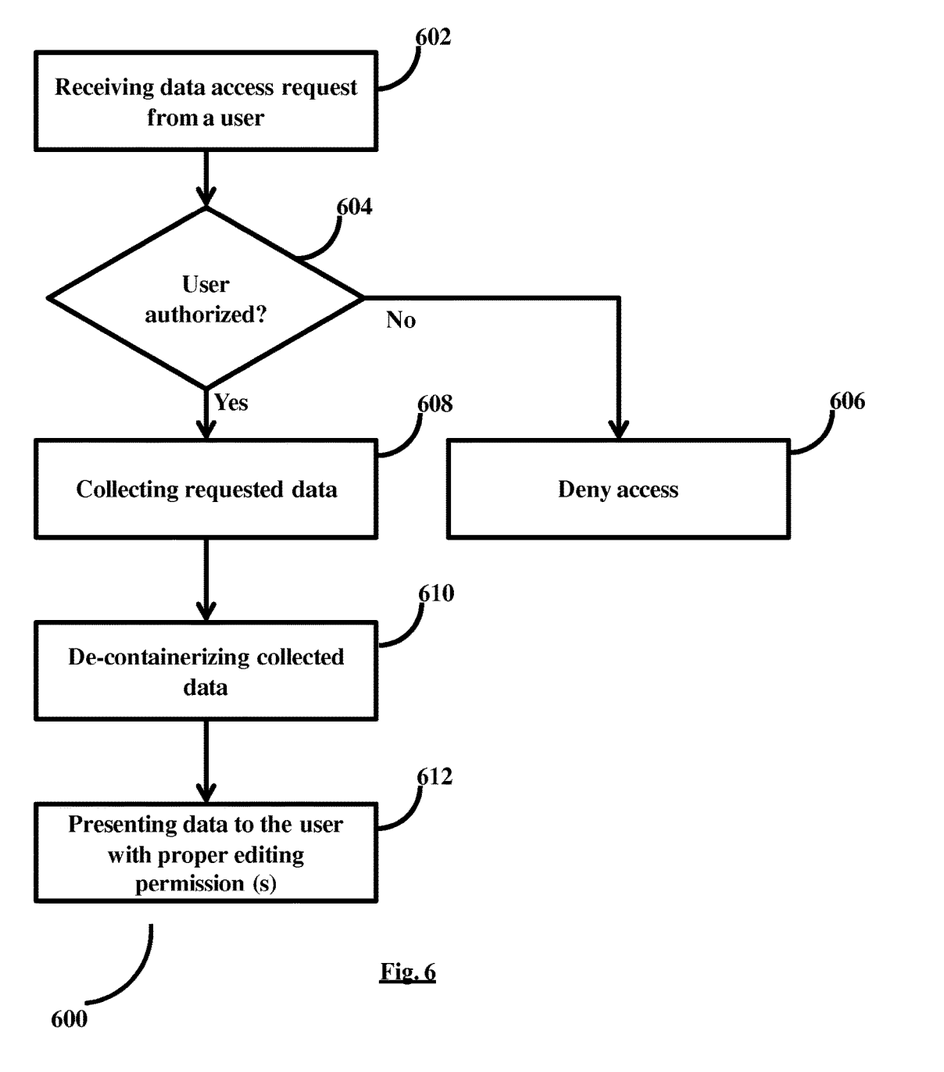
FIG. 6 is a flow diagram which shows steps involved in the process of de-containerizing data using the data management system, as disclosed in the embodiments herein.

FIG. 6 is a flow diagram which shows steps involved in the process of de-containerizing data using the data management system, as disclosed in the embodiments herein. The de-containerization module 202 receives (602) a data access request from the user, and processes the received request to identify the data the user is requesting access to. In an embodiment, the data access request may comprise of a unique identifier which represents the data the user is trying to access.

The de-containerization module 202 further checks (604) whether the user is authorized to access the data. In an embodiment, the de-containerization module 202 may perform the authentication check based on at least one attribute such as but not limited to user attributes, data attributes, device attributes, and access type attributes. In a preferred embodiment, the user access permissions to selected data may be pre-defined in terms of the user attributes corresponding to the user, data attributes corresponding to the selected data, and device specific attributes. In another embodiment, the user access permissions may vary/defined dynamically, based on real time interactions with the containerization module 201, or with the real time inputs provided by the owner/creator/admin of the data. If the user is not authorized to access the data, the de-containerization module denies (606) user access to the selected data.

If the user is found to have access permission to the selected data, the de-containerization module 202 collects (608) the selected data from the data repository, which may be the data server 101. Further, the decrypting module 402 in the de-containerization module 202, using a selected decrypting mechanism, de-containerizes (610) the selected data.

In an embodiment, the user who defined the access permissions may also set editing permissions for each user. The editing permission (s) may define types of action (s) a person who is accessing the data can perform on the data. For example, if the editing permission allows a user to perform only read & write functions, and not sharing function, the person who accesses the data can only perform read/write operations on that particular data, and may not have permission to share the data. In various embodiments, the access and edit rights may be defined at a folder level, a file level, and/or individual content level. For example, the access rights may be configured such that a user may be allowed to edit only a particular paragraph in a particular page. Similarly, rights may be defined such that the user can print only a particular page, and only with a particular water mark.

The various actions in method 600 may be performed in the order presented, in a different order or simultaneously. Further, in some embodiments, some actions listed in FIG. 6 may be omitted.

The embodiments disclosed herein can be implemented through at least one software program running on at least one hardware device and performing network management functions to control the network elements. The network elements shown in FIG. 1 include blocks which can be at least one of a hardware device, or a combination of hardware device and software module.

The embodiments disclosed herein specify a system for information rights management. The mechanism allows discrete data containerization, providing a system thereof. Therefore, it is understood that the scope of protection is extended to such a system and by extension, to a computer readable means having a message therein, said computer readable means containing a program code for implementation of one or more steps of the method, when the program runs on a server or mobile device or any suitable programmable device. The method is implemented in a preferred embodiment using the system together with a software program written in, for example Very high speed integrated circuit Hardware Description Language (VHDL), another programming language, or implemented by one or more VHDL or several software modules being executed on at least one hardware device. The hardware device can be any kind of device which can be programmed including, for example any kind of a computer like a server or a personal computer, or the like, or any combination thereof, for example one processor and two FPGAs. The device may also include means which could be for example hardware means like an ASIC or a combination of hardware and software means, an ASIC and an FPGA, or at least one microprocessor and at least one memory with software modules located therein. Thus, the means are at least one hardware means or at least one hardware-cum-software means. The method embodiments described herein could be implemented in pure hardware or partly in hardware and partly in software. Alternatively, the embodiment may be implemented on different hardware devices, for example using a plurality of CPUs.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims as described herein.

We claim:

1. A method for managing information rights using data containerization, said method comprising:
   receiving at least one data to be containerized from a data server, in response to a request from a user, by a containerization module of a data management server;
   determining at least one rule for containerizing said data by said containerization module, wherein said at least one rule is determined by at least one of an input from the user who initiated said request for managing information rights of said data and a pre-configured policy setting;
   performing at least one action for containerizing said data at least one of an individual data level and a folder level based on said at least one rule by said containerization module, wherein performing the at least one action includes:
      determining at least one attribute associated with said data, by said containerization module, wherein said at least one attribute is determined using at least one of data mining, content analysis of said data, user information, data server information and meta-data of said data;
      determining at least one containerization parameter based on said at least one attribute, by said containerization module;
      determining at least one right to be applied dynamically to said data based on said at least one containerization parameter and said data, by said containerization module;
      determining requirements for receiving at least one additional user input based on at least one of said at least one right and said at least one containerization parameter, by said containerization module;
      receiving said at least one additional user input in response to determining said at least one additional user input is required, by said containerization module;
      determining at least one final set of parameters for containerizing said data, by said containerization module, wherein the at least one final set of parameters is determined by at least one of said at least one additional user input, said at least one attribute, said at least one containerization parameter, said at least one right and said data;
      selecting a data encryption method and at least one encryption key based on at least one of said data and said determined right in response to determining said at least one final set of parameters indicates allowance of containerization, by said containerization module; and, wherein said data encryption method and said at least one encryption key are selected based on at least one of fixed options, random options and said at least one final set of parameters; and
      encrypting said data and at least one of said meta-data, said at least one attribute, said at least one containerization parameter and said at least one right, using said selected data encryption method, by said containerization module;
   selecting at least one data containerization mode for containerizing said databased on at least one of type of data and historical data including information about said at least one containerization mode used for said similar type of data, by said containerization module;
   containerizing said data and at least one of said meta-data, said at least one attribute, said at least one containerization parameter, said at least one right and said encryption key inside a container based on at least one of said at least one action performed based on said at least one rule and said at least one containerization mode, by said containerization module.

2. The method as claimed in claim 1, wherein said right is at least one of a browse, visibility, open, copy, cut, paste, review, tag, label, highlight, print, screenshot, create, view, edit, upload, delete, share, comment, download, refresh, offline access, approval, self-destruct, attach, forward and expire.

3. The method of claim 1, further comprises:
   receiving a data access request from a user for said containerized data from at least one user device, by a de-containerization module of said data management server;
   determining at least one attribute associated with at least one of said user and said at least one user device, by said de-containerization module;
   determining if said user needs to be identified, authenticated and authorized based on at least one of attributes and parameters and rights, by said de-containerization module;
   identifying, authenticating and authorizing said user based on at least one of attributes and parameters and rights, by said de-containerization module;
   determining access permission to said data based on at least one of attributes and parameters and rights, by said de-containerization module;
   de-containerizing said containerized data based on the access permission determined, by said de-containerization module; and
   presenting the de-containerized data to the user by said de-containerization module.

4. A system for managing information rights using data containerization, said system comprising:
   a data server, a data management server, said data management server comprises a containerization module and a de-containerization module, wherein said containerization module is configured to:
   receive at least one data to be containerized from said data server, in response to a request from a user;
   determine at least one rule for containerizing said data, wherein said at least one rule is determined by at least one of an input from the user who initiated said request for managing information rights of said data and a pre-configured policy setting;
   perform at least one action for containerizing said data at least one of an individual data level and a folder level based on said at least one rule by:
      determining at least one attribute associated with said data, by said containerization module, wherein said at least one attribute is determined using at least one of data mining, content analysis of said data, user information, data server information and meta-data of said data;
      determining at least one containerization parameter based on said at least one attribute, by said containerization module;
      determining at least one right to be applied dynamically to said data based on said at least one containerization parameter and said data, by said containerization module;
      determining requirements for receiving at least one additional user input based on at least one of said at least one right and said at least one containerization parameter, by said containerization module; receiving said at least one additional user input in response to determining said at least one additional user input is required, by said containerization module;

determining at least one final set of parameters for containerizing said data, by said containerization module, wherein the at least one final set of parameters is determined by at least one of said at least one additional user input, said at least one attribute, said at least one containerization parameter, said at least one right and said data;

selecting a data encryption method and at least one encryption key based on at least one of said data and said determined right in response to determining said at least one final set of parameters indicates allowance of containerization, by said containerization module; and, wherein said data encryption method and said at least one encryption key are selected based on at least one of fixed options, random options and said at least one final set of parameters; and encrypting said data, and at least one of said meta-data, said at least one attribute, said at least one containerization parameter and said at least one right, using said selected data encryption method, by said containerization module;

select at least one data containerization mode for containerizing said data based on at least one of type of data and historical data including information about said at least one containerization mode used for said similar type of data; and containerize said data and at least one of said meta-data, said at least one attribute, said at least one containerization parameter, said at least one right and said encryption key inside a container based on at least one of said at least one action performed based on said at least one rule and said at least one containerization mode.

5. The system as claimed in claim 4, wherein said encryption module is configured to determine at least one of a browse, visibility, open, cut, copy, paste, review, tag, label, highlight, print, screenshot, create, view, edit, upload, delete, share, comment, download, refresh, offline access, approval, self destruct, attach, forward and expire, as said right.

6. The system as claimed in 4, wherein said de-containerization module of said data management server is further configured to:

receive a data access request from a user for said containerized data from at least one user device;

determine at least one attribute associated with at least one of said user and said at least one user device;

determine if said user needs to be identified, authenticated and authorized based on at least one of attributes and parameters and rights;

identify, authenticate and authorize said user based on at least one of attributes and parameters and rights;

determine access permission to said data based on at least one of attributes and parameters and rights;

de-containerize said containerized data based on the access permission determined; and present the de-containerized data to the user.

* * * * *